United States Patent
Chen et al.

(10) Patent No.: US 8,745,308 B2
(45) Date of Patent: *Jun. 3, 2014

(54) SYSTEM AND METHOD TO ENHANCE MEMORY PROTECTION FOR PROGRAMS IN A VIRTUAL MACHINE ENVIRONMENT

(71) Applicant: VMware, Inc., Palo Alto, CA (US)

(72) Inventors: Xiaoxin Chen, Cupertino, CA (US); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,552

(22) Filed: Dec. 4, 2012

(65) Prior Publication Data

US 2013/0097359 A1     Apr. 18, 2013

Related U.S. Application Data

(63) Continuation of application No. 12/571,190, filed on Sep. 30, 2009, now Pat. No. 8,327,059.

(51) Int. Cl.
*G06F 12/00* (2006.01)

(52) U.S. Cl.
USPC ............... 711/6; 711/150; 711/151; 711/156; 711/158; 711/163; 714/6.1; 714/6.2; 714/6.22; 718/1; 718/100; 718/104; 719/320; 719/324; 719/328

(58) Field of Classification Search
USPC ..................... 711/6, 150, 151, 156, 158, 163; 714/6.1, 6.2, 6.22; 718/1, 100, 104; 719/320, 324, 328
See application file for complete search history.

(56) References Cited

U.S. PATENT DOCUMENTS

| | | | | |
|---|---|---|---|---|
| 5,915,124 A * | 6/1999 | Morris, III | ........................ | 710/9 |
| 6,671,786 B2 * | 12/2003 | Wang et al. | ................... | 711/162 |
| 6,775,754 B2 * | 8/2004 | Okaue et al. | ................... | 711/163 |
| 6,895,491 B2 * | 5/2005 | Kjos et al. | ..................... | 711/203 |
| 7,281,102 B1 * | 10/2007 | Agesen et al. | ................ | 711/163 |
| 7,631,307 B2 * | 12/2009 | Wang et al. | ................... | 718/100 |
| 7,725,305 B2 * | 5/2010 | Taillefer et al. | ................ | 703/23 |
| 7,836,275 B2 * | 11/2010 | Anderson et al. | ............ | 711/206 |
| 7,856,536 B2 * | 12/2010 | Bergheaud et al. | ........... | 711/150 |
| 7,996,659 B2 * | 8/2011 | Renno et al. | ................... | 712/229 |
| 8,028,184 B2 * | 9/2011 | Sekiguchi et al. | ............. | 713/323 |
| 8,055,855 B2 * | 11/2011 | Sarkar et al. | ................ | 711/150 |
| 2006/0026383 A1* | 2/2006 | Dinechin et al. | ............. | 711/207 |
| 2006/0036830 A1* | 2/2006 | Dinechin et al. | ............. | 711/200 |
| 2008/0288940 A1* | 11/2008 | Adams et al. | ..................... | 718/1 |
| 2008/0288941 A1* | 11/2008 | Adams et al. | ..................... | 718/1 |
| 2010/0042753 A1* | 2/2010 | Whaley et al. | .................. | 710/13 |

* cited by examiner

*Primary Examiner* — Stephen Elmore

(57) ABSTRACT

In a computer system supporting execution of virtualization software and at least one instance of virtual system hardware, an interface is provided into the virtualization software to allow a program to directly define the access characteristics of its program data stored in physical memory. The technique includes providing data identifying memory pages and their access characteristics to the virtualization software which then derives the memory access characteristics from the specified data. Optionally, the program may also specify a pre-defined function to be performed upon the occurrence of a fault associated with access to an identified memory page. In this manner, programs operating both internal and external to the virtualization software can protect his memory pages, without intermediation by the operating system software.

29 Claims, 9 Drawing Sheets

SYSTEM AND METHOD TO ENHANCE MEMORY PROTECTION FOR PROGRAMS IN A VIRTUAL MACHINE ENVIRONMENT

CROSS-REFERENCE TO RELATED APPLICATIONS

This application is a Continuation of U.S. patent application Ser. No. 12/571,190, filed Sep. 30, 2009, which has issued as U.S. Pat. No. 8,327,059.

FIELD OF THE INVENTION

This invention relates generally to computer architecture in a virtual machine environment, and, in particular, to a method and system for enhancing memory protection for programs executing both internal and external to the virtualization software.

BACKGROUND OF THE INVENTION

Over the years, a variety of techniques have been used for executing multiple software modules within a computer system. Early computer systems could execute multiple software programs, but they could only execute one program at a time. Such computers might load one program into memory and execute it to completion or other termination, before proceeding to a subsequent program that would then be loaded into memory and executed. As another example, various multitasking operating systems (OSs) enable multiple programs (or selected portions thereof) to be loaded into memory at one time and executed in an alternating manner, according to a scheduling algorithm. Also, some processors include multithreading capabilities, which enable multiple threads of one or more programs to be executed simultaneously on a single processor. Finally, multiprocessor computer systems have also become commonplace, in which each of the multiple processors can execute one or more threads all at the same time.

Such computer systems generally attempt to isolate the code and data of the different software modules within the computer system from each other, so that, for example, one software module cannot interfere with the execution of another software module by altering its code or data. Such isolation may be provided for code and/or data that is stored on a hard drive (or other secondary data storage means) and/or that is resident in main memory (or other primary data storage means).

As one example of the isolation of code and data, many systems implement a virtual addressing mechanism, in which different software modules within the system have different virtual address spaces, with each virtual address space generally being mapped to different portions of the physical address space of the computer system, so that the virtual addresses of a given software module are generally only mapped to physical addresses that contain the code or data of that particular software module. A given software module may attempt to access every memory location in its own virtual address space, accessing every memory location to which it has access, and will still only be able to access its own code and data (assuming that there is no shared memory). Thus, providing a virtual addressing mechanism provides some isolation between the code and data of multiple software modules in a computer system. Various other protection mechanisms may also be implemented in such computer systems to isolate the code and/or data of multiple software modules from one another.

FIG. 1 illustrates a simple computer system 2A having multiple software modules. The computer system 2A includes system hardware 100A, an OS 20A, a first application 40A and a second application 40B. The system hardware 100A may be conventional hardware based on, for example, the x86 platform, and the OS 20A may be, for example, a Windows OS or a Linux OS. The applications 40A and 40B may be any applications designed to run on the system hardware 100A and the OS 20A. The OS 20A also includes a set of drivers 29A, which may be conventional drivers for the OS 20A, possibly including one or more drivers from a company that is different from the OS vendor (a third party vendor).

The OS 20A, in conjunction with the system hardware 100A, attempts to isolate the code and data of the applications 40A and 40B from one another. For example, the OS 20A and the system hardware 100A may implement a virtual addressing mechanism, as described above. As illustrated in FIG. 1, implementing such a protection mechanism may be characterized as establishing an isolation barrier 80B between the applications 40A and 40B, preventing (or at least hindering) one application from accessing the code and data of the other application. There may also be some code and/or data that is shared explicitly or transparently between the applications 40A and 40B. Techniques are known for allowing such sharing of code and data, while maintaining isolation between the applications 40A and 40B. For example, the OS 20A may mark physical memory pages that contain shared code or data as read only, such as when using a copy-on-write (COW) technique. The isolation barrier 80B may be referred to as an "OS isolation barrier" because it is implemented by the OS 20A, in conjunction with the system hardware 100A. The OS 20A, again in conjunction with the system hardware 100A, also establishes an OS isolation barrier 80A between the OS 20A and all applications in the system, including the applications 40A and 40B, so that the applications are prevented (or hindered) from directly accessing the code and data of the OS 20A. In the case of a Windows or Linux OS running on an x86 platform, the OS isolation barrier 80A is established by executing the applications in the system at a supervisor privilege level to access memory pages containing the code and data of the OS 20A.

Although the Windows and Linux OSs provide adequate isolation between software modules for computer systems that contain only well designed and well behaved software modules, malicious software modules have been known to corrupt such computer systems by circumventing the protection mechanisms. In particular, such malicious software modules have been known to breach the OS isolation barriers 80B and 80A, and corrupt the code and/or data of other applications in the system, and/or of the OS itself. Numerous security vulnerabilities have been discovered in the Windows OSs and, to a lesser extent, in the Linux distributions, and many of these vulnerabilities have been exploited by hackers using different types of malicious software, such as viruses, worms, etc. Although the description in this disclosure generally relates to malicious software, it also applies to software that inadvertently has the same or similar effects as malicious software. For example, poorly designed or implemented software may inadvertently bypass protection mechanisms and corrupt the computer system.

Machine virtualization provides certain advantages in establishing OS isolation barriers and application isolation barriers. A virtual machine (VM) is a software abstraction—a "virtualization"—of an actual or an abstract physical computer system. The VM runs as a "guest" on an underlying "host" hardware platform. Guest software, such as a guest OS and guest applications, may be loaded onto the virtual computer for execution. The guest OS may, but need not be, the same as the OS or other system software running at the system level in the host. For example, a Windows OS may be run in the VM even though the OS used to handle actual I/O (input/output), memory management, etc., on the host might be a Linux OS. Also, as long as a suitable interface is provided between the VM and the host platform, a user of a VM need not even be aware that he is not using a "real" computer, that is, a system with hardware dedicated exclusively to his use. The existence of the underlying host can be made transparent to a user of the VM and to the guest software itself. The virtual computer systems described below with reference to FIG. 2, support VMs that have these characteristics.

FIG. 2 illustrates a general computer system 2B in which multiple VMs are implemented to isolate multiple software modules from one another. The computer system 2B includes system hardware 100B, which may be conventional hardware, such as hardware based on the x86 platform. The system hardware 100B may be substantially the same as the system hardware 100A of FIG. 1, or it may be substantially different. Virtualization software 200A executes on the system hardware 100B and supports a plurality of VMs, such as a first VM 300A and a second VM 300B, in a known manner. The virtualization software 200A may comprise a Virtual Machine Monitor (VMM), for example, such as a VMM as implemented in a virtualization product of VMware, Inc., Palo Alto, Calif. Such a VMM and other components of the virtualization software 200A are described in greater detail below.

In supporting the VM 300A, the virtualization software 200A virtualizes a virtual system hardware 310A, which may be based on an existing hardware platform, such as the x86 platform. An OS 20B, along with a set of drivers 29B, run on the virtual system hardware 310A. The OS 20B may be any OS designed to run on the hardware platform virtualized in the virtual hardware 310A. For example, if the virtual hardware 310A is based on the x86 platform, the OS 20B may be a Windows OS or a Linux OS. The set of drivers 29B may be conventional drivers for the OS 20B. A first application 40C and a second application 40D run on the OS 20B. The applications 40C and 40D may be any applications designed to run on the platform of the virtual hardware 310A and the OS 20B. Similar to the OS 20A of FIG. 1, the OS 20B, in conjunction with the virtual system hardware 310A, attempts to isolate the code and data of the applications 40C and 40D from one another, establishing an OS isolation barrier 80B between the applications 40C and 40D. Also similar to the OS 20A of FIG. 1, the OS 20B, again in conjunction with the virtual system hardware 310A, also establishes an OS isolation barrier 80A between the OS 20B and all applications in the VM 300A, including the applications 40C and 40D. Thus, the VM 300A may operate substantially the same as the computer system 2A, except that the virtual system hardware 310A is software abstraction of hardware, created by the virtualization software 200A, instead of physical hardware.

Virtualization software 200A supports VM 300B, including virtual system hardware 310B, OS 20C, drivers 29C, and applications 40E and 40F, in a manner similar to that of VM 300A and its corresponding component elements. Similar to OS 20B, the OS 20C, in conjunction with the virtual system hardware 310B, attempts to isolate the code and data of the applications 40E and 40F from one another, establishing an OS isolation barrier 80B between the applications 40E and 40F. Also similar to the OS 20B, the OS 20C, again in conjunction with the virtual system hardware 310B, establishes an OS isolation barrier 80A between the OS 20C and all applications in the VM 300B, including the applications 40E and 40F. Thus, VM 300B may also be substantially similar to the computer system 2A, except that the virtual system hardware 310B is virtual hardware, virtualized by the virtualization software 200A, instead of physical hardware.

The virtualization software 200A isolates VMs 300A and 300B in the computer system 2B from one another. For example, the virtualization software 200A allows software within the VM 300A to access portions of physical memory in the system hardware 310B and allows software within the VM 300B to access other portions of the physical memory. The virtualization software 200A maps attempted memory accesses from the respective VMs 300A and 300B to different portions of the physical memory, ensuring that no memory address generated by software in one VM can access code or data of another VM. In a similar manner, the virtualization software 200A maps attempted hard disk accesses from the respective VMs 300A and 300B to different portions of one or more hard disks in the system hardware 100B, ensuring that one VM cannot access the hard disk space of another VM.

The virtualization software 200A also takes other precautions to isolate the VMs 300A and 300B in the computer system 2B from one another, and from the virtualization software 200A, itself. For example, commonly assigned, U.S. Pat. No. 7,281,102, Agesen et al., "Restricting Memory Access to Protect Data when Sharing a Common Address Space", which is incorporated herein by this reference for all purposes, describes methods that may be used to enable a VMM to occupy a portion of a linear address space of a VM, while preventing the VM from accessing the memory of the VMM.

Various other methods that may be used to enable virtualization software to coexist with VMs in a virtual computer system, while protecting or isolating the virtualization software from software within the VMs. The virtualization software 200A may also prevent software within the VMs 300A and 300B from directly accessing certain hardware resources to further isolate the VMs from one another and from the virtualization software 200A. For example, the virtualization software 200A may prevent software within the VMs 300A and 300B from directly accessing a Direct Memory Access (DMA) device to prevent the possibility that the DMA device could be used to access either the hard disk space or the memory of other VMs or of the virtualization software itself. Various other precautions may also be taken, depending on the particular implementation.

Thus, the virtualization software 200A, in conjunction with the system hardware 100B, may be said to establish a first isolation barrier 280B between the VMs 300A and 300B and a second isolation barrier 280A between the virtualization software 200A and all VMs in the computer system 2B, including the VMs 300A and 300B. The isolation barriers 280A and 280B may be referred to as "virtualization barriers" because they are implemented by the virtualization software 200A, in conjunction with the system hardware 100B. The isolation barriers 280A and 280B may also be referred to as virtualization barriers because they are established through the virtualization of hardware resources, such as the virtualization of system memory.

It is widely recognized that virtualization techniques can generally provide better security and more effective isolation between multiple software modules than general OSs provide. Thus, the virtualization barriers 280A and 280B of FIG. 2 can generally provide much better isolation between the multiple VMs 300A and 300B and the virtualization software 200A than the OS isolation barriers 80A and 80B of FIG. 1 provide between the multiple applications 40A and 40B and the OS 20A. This improved isolation can be attributed to a variety of factors, depending on the particular situation.

Although computer systems that establish multiple VMs and that run different software modules within the different VMs generally provide better isolation for the software modules than do general OSs, such virtual computer systems have other limitations. First, for example, if the software within a VM becomes corrupted by malicious software, the same problems described above relative to non-virtualized computer systems can occur within the affected VM. If the VM becomes corrupted, software modules within the particular VM may be compromised by the malicious software. In addition, critical programs, such as virus detection or prevention programs running in the VM, are often the targets of malicious attacks. In these attacks, in order to get control of the host system without detection, particularly in a hosted VM environment, the programs that protect the system are typically disabled. Relying on the host OS kernel to protect these programs may be unwise since the OS kernel exposes exploits that allow malicious code to be loaded and run at the most privileged level, thus leaving the entire system unprotected.

Accordingly it is desirable in a virtualized computer system to prevent critical programs from targeted attacked. It is further desirable to protect specific physical memory associated with such programs. It is further desirable to define the properties of the VM's physical memory to protect programs running in the VM. It is further desirable to allow programs executing both internal and external to the virtualization software to secure their code and data in memory without going through the OS kernel.

SUMMARY OF THE INVENTION

In a computer system supporting execution of virtualization software and at least one instance of virtual system hardware, an interface is provided into the virtualization software to allow a program to directly define the access characteristics of its program data stored in physical memory. The technique includes providing data identifying memory pages and their access characteristics to the virtualization software which then derives the memory access characteristics from the specified data. Optionally, the program may also specify a pre-defined function to be performed upon the occurrence of a fault associated with access to an identified memory page. In this manner, programs operating both internal and external to the virtualization software can protect his memory pages, without intermediation by the operating system software.

In accordance with the subject disclosure, an enhancement to the virtualized hardware in a VM, in the form of a new hardware level API, protects memory occupied by a requesting program from targeted attacks. The hardware level API allows programs running in guest memory to define the memory properties of a VM's physical memory, thereby restricting accesses to certain parts of the VM's physical memory, and to further specify policies to respond to violations of the memory protection. The hardware level API can also be used to track specific memory accesses by a debugger. With such enhanced virtual hardware, programs are protected from attacks inside the VM by the VMM.

According to one embodiment, In a computer system having physical system hardware supporting execution of virtualization software including at least a virtual machine monitor (VMM) and at least one instance of virtual system hardware, a method for defining memory access characteristics of program data stored at one or more addresses in physical memory in the system hardware, the method comprising: A) receiving, other than through an operating system, program data identifying selected portions of memory associated with the program and access characteristics thereto; B) setting the memory access characteristics of the selected portions of memory in accordance with the access characteristics specified by the program; and C) executing a post fault activity associated with a selected portion of memory. In one embodiment, the program data identifying access characteristics comprises data identifying one or more pages of memory associated with the program. In another embodiment, the program data identifying access characteristics comprises data identifying any of the read, write or execute characteristics of one or more of the pages of memory associated with the program. In yet another embodiment, the program data identifying access characteristics comprises data identifying post fault activity to be performed following any fault resulting from access to one of the pages of memory associated with the program.

According to a second embodiment, in a computer system having physical system hardware supporting execution of at least virtual machine (VM), the virtual machine further supporting execution of guest program under the control of a guest operating system on a virtual system hardware, a method for defining memory access characteristics of guest program data stored at one or more physical addresses in physical memory in the system hardware, the method comprising: A) providing the guest program with a direct interface to the virtual system hardware that does not require connection to the guest operating system; B) receiving from the guest program data identifying selected portions of memory associated with the guest program and the access characteristics thereto; C) setting the memory access characteristics of the selected portions of memory in accordance with the access characteristics specified by the guest program; and D) performing a pre-defined function upon the occurrence of a trace fault associated with the selected portions of memory.

According to a third embodiment, In a computer system having physical system hardware supporting execution of at least virtual machine (VM), the virtual machine further supporting execution of guest program under the control of a guest operating system on a virtual system hardware, a method for defining memory access characteristics of guest program data stored at one or more physical addresses in physical memory in the system hardware, the method comprising: A) providing the guest program with a direct interface to the virtual system hardware that does not require connection to the guest operating system; B) receiving from the guest program data identifying at least one memory page containing data associated with the guest program; C) receiving from the guest program data identifying memory access characteristics for the at least one memory page containing data associated with the guest program; D) receiving from the guest program defining a post fault activity; E) setting the memory access characteristics for the at least one memory page at least partially in accordance with data received from the guest program; and F) if the system hardware generates a fault upon an attempted memory access operation to the at least one memory page containing data associated with the guest program, performing the post fault activity.

According to a fourth embodiment, a computer program product for use with a computer system having physical system hardware supporting execution of at least virtual machine (VM), the virtual machine further supporting execution of guest program under the control of a guest operating system on a virtual system hardware the computer program product comprising a computer readable medium having embodied therein program code comprising A) program code for providing the guest program with a direct interface to the virtual system hardware that does not require connection to the guest operating system; B) program code for receiving from the guest program data identifying selected portions of memory associated with the guest program and the access characteristics thereto; C) program code for setting the memory access characteristics of the selected portions of memory in accordance with the access characteristics specified by the guest program; and D) program code for performing a pre-defined function upon the occurrence of a trace fault associated with the selected portions of memory.

According to a fifth or embodiment, a computer system comprises physical system hardware comprising a processor and plurality of physical memory locations; virtualization software executing on the system hardware and supporting at least one virtual machine (VM) and one instance of virtual system hardware; and an interface to the virtual system hardware directly accessible by a program without intermediate control by operating system software, the interface comprising, i) program logic responsive to data identifying selected portions of memory associated with the program and the access characteristics associated therewith; ii) program logic for setting the memory access characteristics of the selected portions of memory in accordance with the access characteristics specified by the program; and iii) program logic for performing a predefined function upon the occurrence of a fault associated with the selected portions of the memory.

DETAILED DESCRIPTION

Figure 3A:
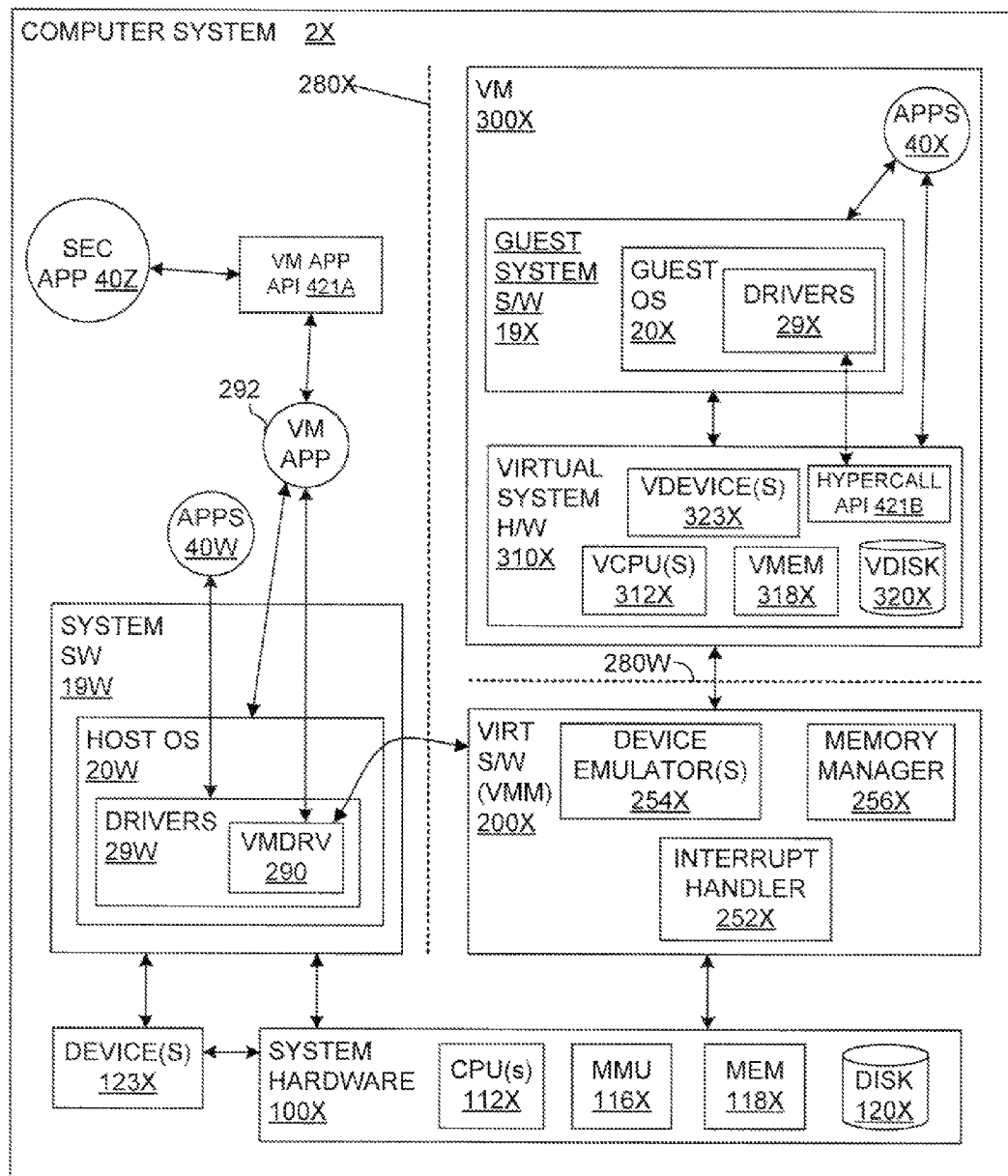
FIGS. 3A-C illustrates various virtual computer system installed on a hosted system, with memory protection API interfaces both internal and external to the virtual machine monitor.

FIG. 3A illustrates the main components of a computer system 2X that supports a hosted VM 300X, in accordance with the present disclosure. A virtualization environment in which the disclosed concepts may be implemented is the Workstation virtualization product of VMware, Inc. As in conventional (non-virtualized) computer systems, both system hardware 100X and system software 19W are included. The system hardware 100X includes CPU(s) 112X, which may be a single processor, or two or more cooperating processors in a known multiprocessor arrangement. The system hardware also includes system memory 118X, one or more disks 120X, and some form of Memory Management Unit (MMU) 116X. As is well understood in the field of computer engineering, the system hardware also includes, or is connected to, conventional registers, interrupt-handling circuitry, a clock, etc., which, for the sake of simplicity, are not shown in the figure.

The system software 19W either is or at least includes an operating system (OS) 20W, which has drivers 29W as needed for controlling and communicating with various devices 123X, and usually with the disk 120X as well. Conventional applications 40W, if included, may be installed to run on the hardware 100X via the system software 19W and any drivers needed to enable communication with devices.

The virtual machine (VM) 300X—also known as a "virtual computer"—is a software implementation of a complete computer system. In the VM, the physical system components of a "real" computer are emulated in software, that is, they are virtualized. Thus, the VM 300X will typically include virtualized ("guest") system hardware 310X, which in turn includes one or more virtual CPUs 312X (VCPU), virtual system memory 318X (VMEM), one or more virtual disks 320X (VDISK), and one or more virtual devices 323X (VDEVICE), all of which are implemented in software using known techniques to emulate the corresponding components of an actual computer.

The VM 300X also includes system software 19X, which may include a guest operating system 20X, which may, but need not, simply be a copy of a conventional, commodity OS, as well as drivers 29X (DRVS) as needed, for example, to control the virtual device(s) 323X. Note that a disk—virtual or physical—is also a "device," but is usually considered separately because of its essential role. FIG. 3A also illustrates one or more applications 40X installed to run on the guest OS 20X. Any number of applications may be loaded for running on the guest OS, the number being limited only by the requirements of the VM. Software running in the VM 300X, including the guest OS 20X and the guest applications 40X, is generally referred to as "guest software."

Note that although the virtual hardware "layer" 310X will be a software abstraction of physical components, the VM's system software 19X may be the same as would be loaded into a hardware computer. The modifier "guest" is used here to indicate that the VM, although it acts as a "real" computer from the perspective of a user and guest software, is actually just computer code that is executed on the underlying "host" hardware 100X and software platform 19W. Thus, for example, I/O to a virtual device 323X will actually be carried out by I/O to a corresponding hardware device 123X, but in a manner transparent to the VM.

Some interface is usually required between the VM 300X and the underlying "host" hardware 100X, which is responsible for actually executing VM-related instructions and transferring data to and from the actual, physical memory 118X and other system hardware 100X. One advantageous interface between the VM and the underlying host system is often referred to as a Virtual Machine Monitor (VMM), also known as a virtual machine "manager."

A VMM is usually a relatively thin layer of software that runs directly on top of a host, such as the system software 19W, or directly on the hardware, and virtualizes the resources of the (or some) hardware platform. FIG. 3A shows virtualization software 200X, which may be implemented as a VMM, running directly on the system hardware 100X. The virtualization software 200X is also referred to as a VMM 200X herein, although it may alternatively comprise other virtualization software that may not be considered or called a VMM. The VMM 200X will typically include at least one device emulator 254X, which may also form the implementation of the virtual device(s) 323X. The interface exported to the respective VM is usually such that the guest OS 20X cannot determine the presence of the VMM. The VMM also usually tracks and either forwards (to the host OS 20W) or itself schedules and handles all requests by its VM for machine resources, as well as various faults and interrupts. FIG. 3A therefore illustrates an interrupt (including fault) handler 252X within the VMM. The VMM also includes a memory manager 256X, the general operation of which is described below. The general features of VMMs are well known and are therefore not discussed in further detail here.

FIG. 3A illustrates a single VM 300X merely for the sake of simplicity; in many installations, there will be more than one VM installed to run on the common hardware platform; all may have essentially the same general structure, although the individual components need not be identical. Also in FIG. 3A, a single VMM 200X is shown acting as the interface for the single VM 300X. It would also be possible to include the VMM as part of its respective VM. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simpler to include a separate VMM for each VM.

In the system illustrated in FIG. 3A, both the host OS and the VMM are installed at system level, meaning that they both run at the greatest privilege level and can therefore independently modify the state of the hardware processor(s). For I/O to at least some devices, however, the VMM may issue requests via the host OS 20W. To make this possible, a special driver VMDRV 290 is installed as any other driver within the host OS 20W and exposes a standard API to a user-level application VMAPP 292. When the system is in the VMM context, meaning that the VMM is taking exceptions, handling interrupts, etc., but the VMM wishes to use the existing I/O facilities of the host OS, the VMM calls the driver VMDRV 290, which then issues calls to the application VMAPP 292, which then carries out the I/O request by calling the appropriate routine in the host OS.

Figure 1:
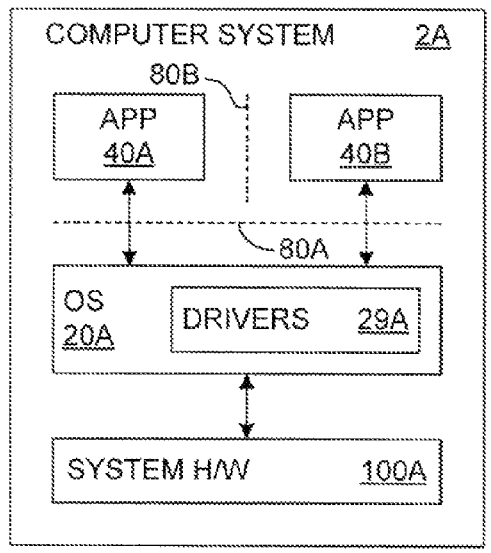
FIG. 1 illustrates a simple computer system running multiple software modules on a general operating system.
Figure 2:
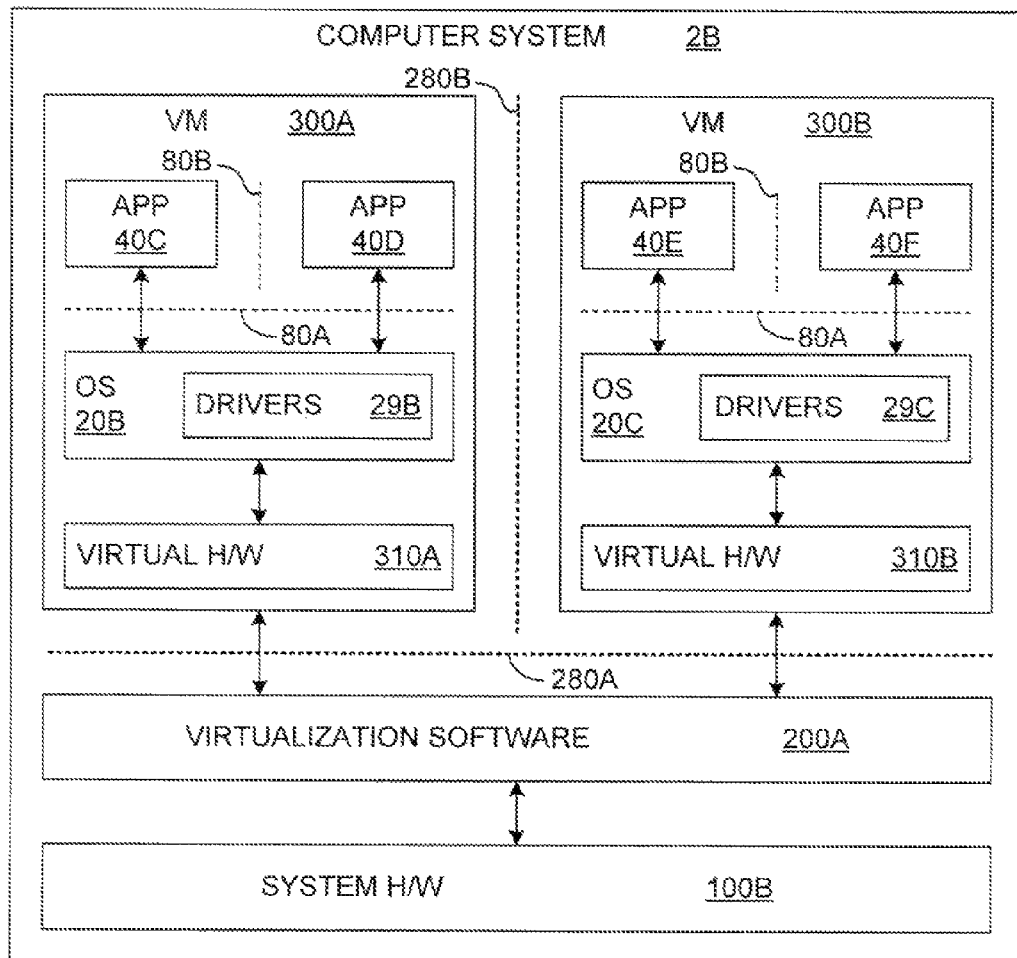
FIG. 2 illustrates a virtual computer system with multiple virtual machines for running multiple software modules.

In FIG. 3A, a vertical line 280X symbolizes the boundary between the virtualized (VM/VMM) and non-virtualized (host software) "worlds" or "contexts." The driver VMDRV 290 and application VMAPP 292 thus enable communication between the worlds even though the virtualized world is essentially transparent to the host system software 19W. The line 280X may also be characterized as a "virtualization barrier", as that term is used above. However, the virtualization barrier 280X does not provide a complete a barrier, or as secure a barrier, between the host OS 20W and the VM 300X, as the virtualization barrier 280B provides between the VM 300A and the VM 300B of FIG. 2. This is primarily because the system software 19W has direct access to the system hardware 100X, including all of the memory 118X and the disk 120X, including, in particular, the memory and disk space that contains the code and data of the VMM 200X and the VM 300X. Accordingly, the virtualization barrier 280X may be referred to more specifically as a "limited virtualization barrier," while the virtualization barrier 280B may be referred to more specifically as a "complete virtualization barrier" or as a "bidirectional virtualization barrier." Another virtualization barrier would be established between the VM 300X and any other VM in the computer system 2X, although no such other virtualization barrier is illustrated in FIG. 3A because only one VM is illustrated. FIG. 3A does show a virtualization barrier 280W between the VM 300X and the VMM 200X. The virtualization barrier 280W may be substantially the same as the virtualization barrier 280A of FIG. 2.

In the computer system 2X of FIG. 3A, the VMM is co-resident at system level with a host operating system. Both the VMM and the host OS can independently modify the state of the host processor, but the VMM calls into the host OS via a driver and a dedicated user-level application to have the host OS perform certain I/O operations on behalf of the VM. The virtual computer in this configuration is thus fully hosted in that it runs on an existing host hardware platform and together with an existing host OS.

Kernel-Based Virtual Computer System

Figure 4:
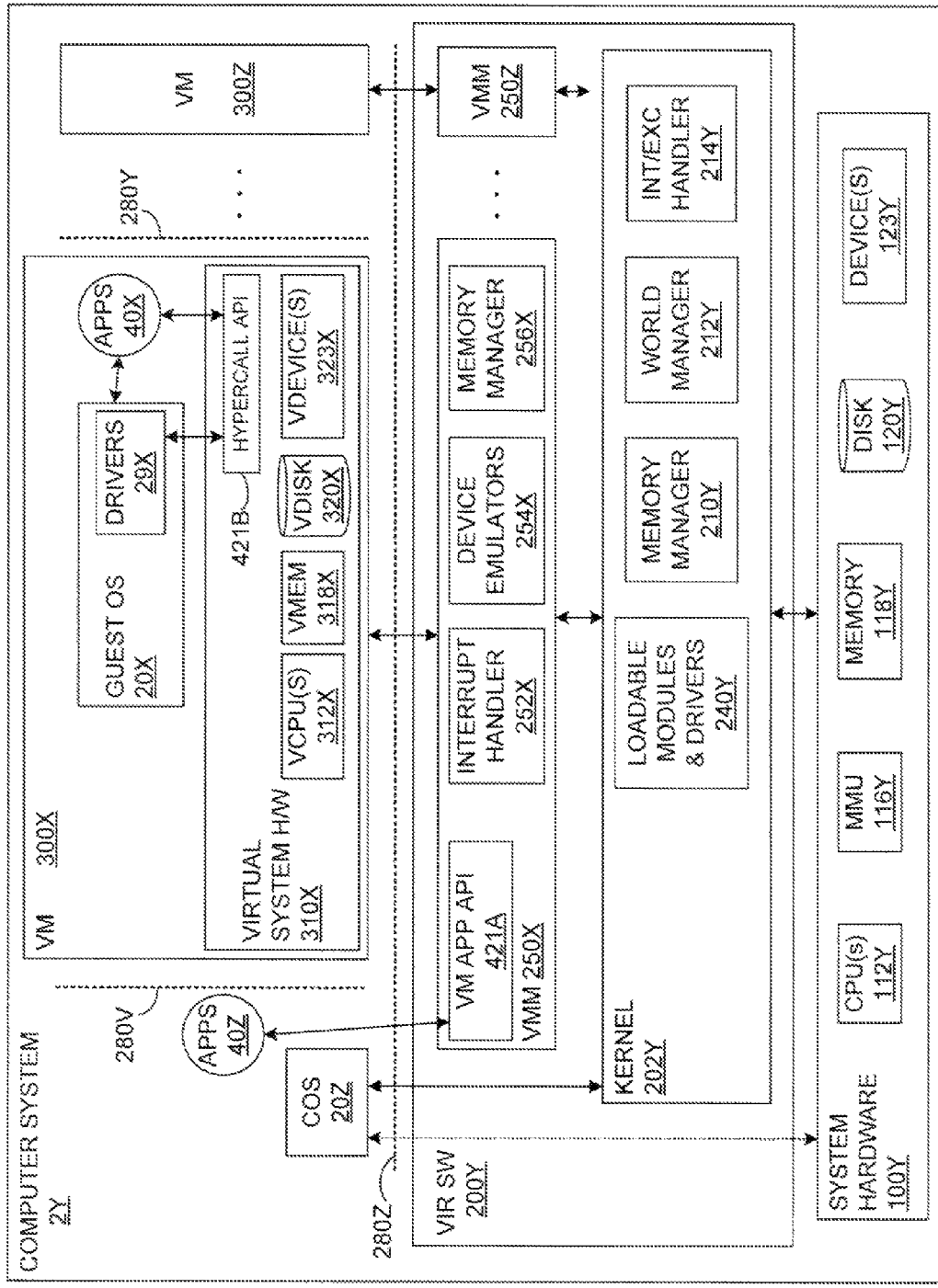
FIG. 4 illustrates a virtual computer system installed on a non-hosted system, with memory protection API interfaces both internal and external to the virtual machine monitor.

In other implementations of a virtual machine environment, a dedicated kernel takes the place of and performs the conventional functions of the host OS, and virtual computers run on the kernel. FIG. 4 illustrates the main components of a computer system 2Y that supports a plurality of "kernel-based" VMs 300X-300Z, in accordance with the present disclosure. A virtualization environment in which the disclosed concepts may be implemented is the Workstation virtualization product of VMware, Inc. In FIG. 4, the kernel serves as the system software for one or more VMM/VM pairs. Compared with a system in which VMMs run on a host OS, use of a kernel offers greater modularity and facilitates provision of services that extend across multiple VMs (for example, for resource management). Compared with the hosted deployment, a kernel may offer greater performance because it can be co-developed with the VMM and be optimized for the characteristics of a workload consisting of VMMs. The ESX Server virtualization product of VMware, Inc., has such a configuration. A kernel-based virtualization system of the type illustrated in FIG. 4 is described in commonly assigned U.S. Pat. No. 6,961,941, Nelson et al., entitled Computer Configuration for Resource Management in Systems Including a Virtual Machine, which is incorporated herein by this reference for all purposes.

FIG. 4 illustrates the general configuration of a kernel-based virtual computer system 2Y, including one or more virtual machines (VMs), such as a first VM 300X and a second VM 300Z, each of which is installed as a "guest" on a "host" hardware platform 100Y. As FIG. 4 shows, the hardware platform 100Y includes one or more processors (CPUs) 112Y, system memory 118Y, and one or more disks 120X. The hardware 100Y may also include other conventional mechanisms such as a Memory Management Unit (MMU) 116Y and various devices 123Y.

The VM 300X includes virtual system hardware 310X, which typically includes at least one virtual CPU 312X, at least one virtual disk 320X, a virtual system memory 318X, and various virtual devices 323X. The VM 300X also includes a guest operating system 20X (which may simply be a copy of a conventional operating system) running on the virtual system hardware 310X, along with a set of drivers 29X for accessing the virtual devices 323X and the virtual disk 320X. One or more applications 40Y may execute in the VM 300X on the guest OS 20X and the virtual system hardware 310X All of the components of the VM may be implemented in software using known techniques to emulate the corresponding components of an actual computer. This implementation of the VM 300X may generally be substantially the same as the implementation of the VM 300X in FIG. 3A.

The VMs 300X and 300Z are supported by a virtualization software 200Y comprising a kernel 202Y and a set of VMMs, including a first VMM 250X and a second VMM 250Z. In this implementation, each VMM supports one VM. Thus, the VMM 250X supports the VM 300X and the VMM 250Z supports the VM 300Z. The VMM 250X includes, among other components, device emulators 254X, which may constitute the virtual devices 323X that the VM 300X accesses. The VMM 250X may also include a memory manager 256X, the general operation of which is described below. The VMM also usually tracks and either forwards (to some form of system software) or itself schedules and handles all requests by its VM for machine resources, as well as various faults and interrupts. A mechanism known in the art as an exception or interrupt handler 252X may therefore be included in the VMM. The VMM will handle some interrupts and exceptions completely on its own. For other interrupts/exceptions, it will be either necessary or at least more efficient for the VMM to call the kernel to have the kernel either handle the interrupts/exceptions itself, or to forward them to some other sub-system such as a console OS as described below. The VMM may forward still other interrupts to the VM.

The computer system 2Y may initially have an existing operating system 20Z that may be at system level, and the kernel 202Y may not yet even be operational within the system. The initial system level interface between the OS 20Z and the system hardware 100Y is shown by a dashed line in FIG. 4. In such case, one of the functions of the OS 20Z may be to make it possible to load the kernel 202Y, after which the kernel runs on the native hardware 100Y and manages system resources. In effect, the kernel, once loaded, displaces the OS 20Z. Thus, the kernel 202Y may be viewed either as displacing the OS 20Z from the system level and taking this place itself, or as residing at a "sub-system level." When interposed between the OS 20Z and the hardware 100Y, the kernel 202Y essentially turns the OS 20Z into an "application," which has access to system resources only when allowed by the kernel 202Y. The kernel then schedules the OS 20Z as if it were any other component that needs to use system resources. Accordingly, another interface is shown between the OS 20Z and the kernel 202Y for enabling the OS 20Z to access the system hardware 100Y. This second interface is shown with a solid line in FIG. 4.

The OS 20Z may also be included to allow applications unrelated to virtualization to run; for example, a system administrator may need such applications to monitor the hardware 100Y or to perform other administrative routines. The OS 20Z may thus be viewed as a "console" OS (COS). In such implementations, the kernel 202Y preferably also includes a remote procedure call (RPC) mechanism to enable communication between, for example, the VMM 250X and any applications 40Z installed to run on the COS 20Z.

The kernel 202Y handles the various VMM/VMs and the COS 20Z as entities that can be separately scheduled, which are referred to as "worlds". The worlds are controlled by a world manager, represented in FIG. 4 within the kernel 202Y as module 212Y. The kernel 202Y preferably also includes an interrupt/exception handler 214Y that is able to intercept and handle interrupts and exceptions for all devices on the machine.

The kernel 202Y also includes a system memory manager 210Y that manages all machine memory that is not allocated exclusively to the COS 20Z. When the kernel 202Y is loaded, the information about the maximum amount of memory available on the machine is available to the kernel, as well as information about how much of it is being used by the COS 20Z. Part of the machine memory is used for the kernel 202Y itself and the rest is used for the virtual machine worlds. Virtual machine worlds use machine memory for two purposes. First, memory is used to back portions of a world's memory region, that is, to store code, data, stacks, etc. For example, the code and data for the VMM 250X is backed by machine memory allocated by the kernel 202Y. Second, memory is used for the guest memory of the virtual machine. The memory manager may include any algorithms for dynamically allocating memory among the different VM's.

In some embodiments, the kernel 202Y is responsible for providing access to all devices on the physical machine. In addition to other modules that the designer may choose to load onto the system for access by the kernel, the kernel will therefore typically load conventional drivers as needed to control access to devices. Accordingly, FIG. 4 shows a module 240Y containing loadable kernel modules and drivers. The kernel 202Y may interface with the loadable modules and drivers in a conventional manner, using an API or similar interface.

FIG. 4 also shows a first virtualization barrier 280V between the COS 20Z and the VMs 300X and 300Z, a second virtualization barrier 280Y between the VMs 300X and 300Z, and a third virtualization barrier 280Z between the virtualization software 200Y and the VMs 300X and 300Z, as well as the COS 20Z. There would also be additional virtualization barriers between any other VMs in the computer system. The virtualization barriers 280V and 280Y may be substantially the same as the virtualization barrier 280B of FIG. 2, while the virtualization barrier 280Z may be substantially the same as the virtualization barrier 280A also of FIG. 2.

Memory Mapping in a Virtual Computer System

When memory addresses are generated in the VM 300X of FIG. 3A, either by the applications 40X or the guest system software 19X, the addresses are generally mapped to corresponding addresses in the physical memory 118X. Both the guest OS 20X and the memory manager 256X are involved in this mapping process. Similarly, when memory addresses are generated in the VM 300X of FIG. 4, either by the applications 40Y or the system software of the VM 300X, the guest OS 20X and the memory manager 256X are involved in the process of mapping the addresses to corresponding addresses in the physical memory 118Y. These address mapping processes are substantially similar in both the hosted virtual computer system 2X of FIG. 3A and the kernel-based virtual computer system 2Y of FIG. 4. Thus, the following description is generally limited to the process of mapping addresses from the VM 300X of FIG. 3A to the physical memory 118X, although it generally also applies to the corresponding process of FIG. 4, and to corresponding processes in other virtual computer systems.

Most modern computers implement a "virtual memory" mechanism, as described briefly above, which allows user-level software to specify memory locations using a set of virtual addresses. These virtual addresses are then translated or mapped into a different set of physical addresses that are actually applied to physical memory to access the desired memory locations. The range of possible virtual addresses that may be used by user-level software constitute a virtual address space, while the range of possible physical addresses that may be specified constitute a physical address space. The virtual address space is typically divided into a number of virtual memory pages, each having a different virtual page number, while the physical address space is typically divided into a number of physical memory pages, each having a different physical page number. A memory "page" in either the virtual address space or the physical address space typically comprises a particular number of memory locations, such as either a four kilobyte (KB) memory page or a two megabyte (MB) memory page, as in an x86 computer system.

In a conventional, non-virtualized computer system, system-level software generally specifies mappings from memory pages in the virtual address space using virtual page numbers to memory pages in the physical address space using physical page numbers. The terms "virtual address" and "virtual address space" relate to the well-known concept of a virtual memory system, which should not be confused with the computer virtualization technology described elsewhere in this disclosure, involving other well-known concepts such as VMMs and VMs. A well-known technique of memory paging may be used to enable an application to use a virtual address space that is larger than the amount of physical memory that is available for use by the application. The code and data corresponding to some of the pages in the virtual address space may reside in physical memory, while other pages of code and data may be stored on a disk drive, for example. If the application attempts to access a memory location in the virtual address space for which the corresponding data is stored on the disk drive, instead of in physical memory, then the system software typically loads a page worth of data from the disk drive including the desired data into a page of physical memory (possibly first storing the contents of the memory page to disk). The system software then allows the attempted memory access to complete, accessing the physical memory page into which the data has just been loaded.

If the host OS 20W of FIG. 3A implements a virtual memory system, with memory paging and an application 40W requests access to the hardware memory 118X, for example, the request is issued with a virtual address, which is be mapped to a physical address that is issued to the actual hardware memory. This mapping, or translation, is typically specified by the OS 20W, which includes some form of memory management module for this purpose. The OS thus converts the "virtual" address (VA), in particular, the virtual page number (VPN) of the request, into a "physical" address (PA), in particular, a physical page number (PPN), that can be applied directly to the hardware. (The VA and PA have a common offset from a base address, so that only the VPN needs to be converted into a corresponding PPN.)

When accessing a given memory location specified by a virtual address, the processor breaks the virtual address into a virtual page number (higher-order address bits) plus an offset into that page (lower-order address bits). The virtual page number (VPN) is then translated using mappings established by the OS into a physical page number (PPN) based on a page table entry (PTE) for that VPN in the page tables associated with the currently active address space. The page tables will therefore generally include an entry for every VPN. The actual translation may be accomplished simply by replacing the VPN (the higher order bits of the virtual address) with its PPN mapping, leaving the lower order offset bits the same.

To speed up virtual-to-physical address translation, a hardware structure known as a translation look-aside buffer (TLB) is normally included, for example, as part of the hardware Memory Management Unit (MMU) 116X. The TLB contains, among other information, VA-to-PA mapping entries at least for VPNs that have been addressed recently or frequently. Rather than searching all the page tables, the TLB is searched first instead. If the current VPN is not found in the TLB, then a "TLB miss" occurs, and the page tables in memory are consulted to find the proper translation, and the TLB is updated to include this translation. The OS thus specifies the mapping, but the hardware MMU 116X usually actually performs the conversion of one type of page number to the other. Below, for the sake of simplicity, when it is stated that a software module "maps" page numbers, the existence and operation of a hardware device such as the MMU 116X may be assumed.

An extra level of addressing indirection is typically implemented, however, in virtualized systems in that a VPN issued by an application 40X in the VM 300X is remapped twice in order to determine which page of the hardware memory is intended. A mapping module within the guest OS 20X translates the guest VPN (GVPN) into a corresponding guest PPN (GPPN) in the conventional manner. The guest OS therefore "believes" that it is directly addressing the actual hardware memory, but in fact it is not. Of course, a valid address to the actual hardware memory address should be used.

The memory manager 256X therefore takes the GPPN issued by the guest OS 20X and maps it to a hardware page number PPN that can be used to address the hardware memory 118X. Note that in some literature involving virtualized systems, GVPNs, GPPNs, VPNs and PPNs are sometimes referred to as "VPNs," "PPNs," "VPNs" and "MPNs," respectively, where "MPN" means "machine page number," that is, the page number used to address the hardware memory. The problem is, though, that "VPN" is then used to mean the virtual page number in both the guest and host contexts, and one should be aware of the current context to avoid confusion. Regardless of notation, however, the intermediate GPPN→PPN mapping performed by the VMM is transparent to the guest system.

Figure 5:
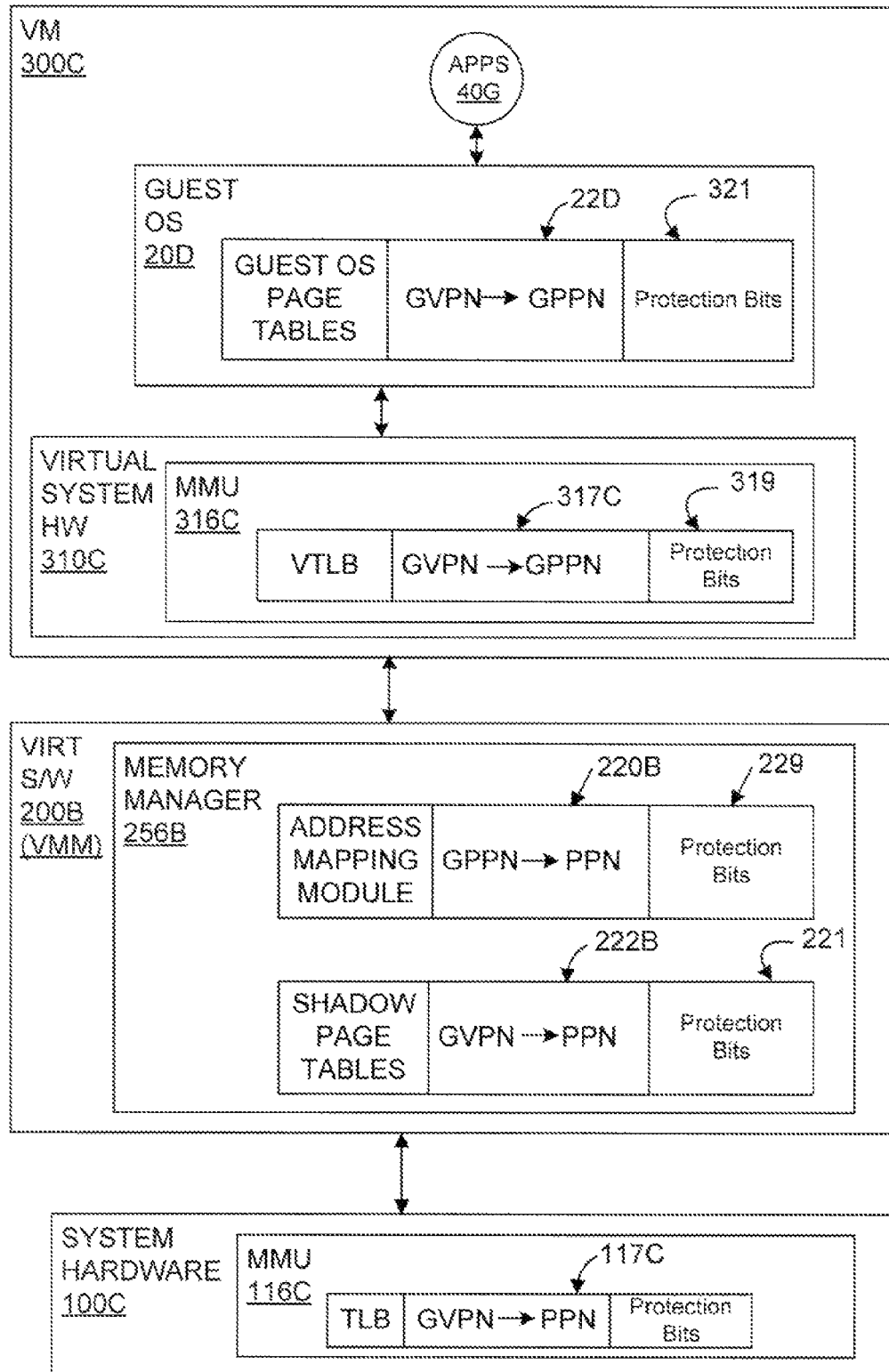
FIG. 5 illustrates address indirection when mapping virtual memory addresses in a virtual computer system including access mode data.

FIG. 5 shows a more abstract virtual computer system that can represent either the computer system 2X of FIG. 3A or the computer system 2Y of FIG. 4. FIG. 5 illustrates the address mapping process described above and some of the functional units that are involved in this process. FIG. 5 shows a system hardware 100C, which includes an MMU 116C, which further includes a TLB 117C. The MMU 116C may be the same as the MMU 116X of FIG. 3A or the MMU 116Y of FIG. 4.

Virtualization software 200B executes on the system hardware 100C, and may be substantially the same as the virtualization software 200X of FIG. 3A or the virtualization software 200Y of FIG. 4. The virtualization software 200B includes a memory manager 256B, which further includes an address mapping module 220B and a set of shadow page tables 222B. The memory manager 256B may be substantially the same as the memory manager 256X of FIG. 3A or the memory manager 256X of FIG. 4.

The virtualization software 200B supports a VM 300C, which may be substantially the same as the VM 300X of FIG. 3A or the VM 300X of FIG. 4. The VM 300C includes virtual system hardware 310C, which further includes an MMU 316C, which may further include a virtual TLB (VTLB) 317C, although the MMU 316C may also be implemented without a virtual TLB. The VM 300C also includes a guest OS 20D and a set of one or more applications 400. The guest OS 20D includes a set of guest OS page tables 22D.

The guest OS 20D generates the guest OS page tables 22D that map the guest software virtual address space to what the guest OS perceives to be the physical address space. In other words, the guest OS 20D maps GVPNs to GPPNs. Suppose, for example, that a guest application 400 attempts to access a memory location having a first GVPN, and that the guest OS has specified in the guest OS page tables that the first GVPN is backed by what it believes to be a physical memory page having a first GPPN.

The address mapping module 220B keeps track of mappings between the GPPNs of the guest OS 20D and the "real" physical memory pages of the physical memory within the system hardware 100C. Thus, the address mapping module 220B maps GPPNs from the guest OS 20D to corresponding PPNs in the physical memory. Continuing the above example, the address mapping module translates the first GPPN into a corresponding PPN, let's say a first PPN.

The memory manager 256B creates a set of shadow page tables 222B that are used by the MMU 116C. The shadow page tables 222B include a number of shadow PTEs that generally correspond to the PTEs in the guest OS page tables 22D, but the shadow PTEs map guest software virtual addresses to corresponding physical addresses in the actual physical memory, instead of to the physical addresses specified by the guest OS 20D. In other words, while the guest OS page tables 22D provide mappings from GVPNs to GPPNs, the shadow PTEs in the shadow page tables 222B provide mappings from GVPNs to corresponding PPNs. Thus, continuing the above example, instead of containing a mapping from the first GVPN to the first GPPN, the shadow page tables 222B would contain a shadow PTE that maps the first GVPN to the first PPN. Thus, when the guest application attempts to access a memory location having the first GVPN, the MMU 116C loads the mapping from the first GVPN to the first PPN in the shadow page tables 222B into the physical TLB 117C, if the mapping is not already there. This mapping from the TLB 117C is then used to access the corresponding memory location in the physical memory page having the first PPN.

For purposes of this disclosure, certain address mapping phrases are defined as follows: address mappings or translations from guest virtual addresses to guest physical addresses (e.g. mappings from GVPNs to GPPNs) are defined as "guest address mappings" or just "guest mappings;" address mappings or translations from guest physical addresses to actual physical addresses (e.g. mappings from GPPNs to PPNs) are defined as "virtualization address mappings" or just "virtualization mappings;" and address mappings or translations from guest virtual addresses to actual physical addresses (e.g. from GVPNs to PPNs) are defined as "shadow address mappings" or just "shadow mappings." "Hardware address mappings" or "hardware mappings" are defined more generally as any address mappings or translations that provide mappings to actual physical memory, such that "hardware address mappings" include both "virtualization address mappings" and "shadow address mappings."

Systems and techniques for performing memory tracing to detect accesses to certain areas of the guest physical memory so that VMM can emulate virtual CPU and devices correctly are described in commonly assigned U.S. Pat. Nos. 6,961,806 and 7,149,843, both entitled System and Method for Detecting Access to Shared Structures, the subject matters of which are incorporated herein by this reference for all purposes. U.S. Pat. Nos. 6,961,806 and 7,149,843, disclose a system and technique for trace protection wherein in the VM's MMU, a VTLB entry contains protection bits specified by the guest OS for the GVPN→GPPN mapping. In the VMM, the memory manager specifies protections bits of the GPPN→PPN mapping. In the shadow page table, the VMM derives the protection bits for a GVPN→PPN mapping by combining the access with the protection bits specified above.

In addition, commonly assigned U.S. patent application Ser. No. 11/584,178, filed Oct. 20, 2006, entitled "Isolating Data within a Computer System Using Private Shadow", by Chen et al., the subject matter of which is incorporated herein by this reference for all purposes, describes methods that conceals the memory contents of the protected program and perform secure measurements to authenticate hypercalls.

Memory Protection Mechanism

If malicious software is able to execute within the VM 300X, it could compromise all the software within the VM, including the guest OS 20X and all the applications 40X, notwithstanding the virtualization barrier 280X between the VM 300X virtualization software 250X and VM 300X. FIGS. 3A-C and 4 illustrate an Application Program Interface (API) that may be used to address the above issue. In accordance with the concepts disclosed herein, an API to the virtual system hardware is provided in to enable a program to protect its code and data in memory without the intermediation or invention of the operating system, that is, the operating system is not required to communicate or establish the memory access characteristics with the virtual machine monitor on behalf of the program or application, whether such program or application is executing internal or external to a virtual machine.

In the systems disclosed in FIGS. 3A-C and 4, such functionality is implemented with the VM APP API 421A and Hypercall API 421B. Specifically, these APIs provides functions to protect/unprotect guest PPNs using trace faulting mechanism of the VMM described herein. Programs that are aware of this hardware level API can use such feature to secure their code and data without going through the OS kernel, thereby preventing malicious programs from attacking the new API. In these implementations, either APP 40Z or APP 40X can access the virtual hardware resources, without the intermediation of OS 20X (or other software modules in the VM 250X), to secure their respective code and data in memory.

The functionality of the API will be initially described with reference to Hypercall API 421B and its interaction with guest program APP 40X. From within the VM 300X, APP 40X may initiate protection of its code and data through the use of hypervisor calls. A hypervisor call is a special function that allows select software modules to communicate with the virtualization software 250X. For example, a software module in the VM 300X, may place information into one or more registers or into memory and then execute an instruction that causes a hardware fault, such as an IN or OUT instruction in the current x86 platform, or an instruction such as VMCALL from the new Vanderpool or Virtualization Technology from Intel Corporation. The virtualization software 250X then responds to the hardware fault, obtains the information passed by APP 40X and reacts accordingly.

When APP 40X makes a call to secure its memory, a hypervisor call is first made by the secure API 421B to the virtualization software 250X. If the APP 40X makes a hypercall using a memory pointer, the API 421B copies the data structure pointed to by the memory pointer (or some portion of memory that includes the data structure) from the private memory, at corresponding locations in the virtual address space.

An exemplary implementation of the hypercall function API 421B in the "C" programming language suitable for use with the present invention is shown below:

Bool Hyp_Protect(PPN_List *ppnList, Protection prot, Handle handle);

Bool Hyp_Unprotect(PPN_List *ppnList);

In the above example the "ppnList" parameter may comprise a list of PPNs to be protected/unprotected. Alternatively, "ppnList" may comprise a list of VPNs, if functionality exists within the VMM to search the guest page table to find the corresponding PPNs. In the above example, hypercall API function "prot" comprises functionality that enables access to the pages to be disallowed, i.e. a combination of read, write, execute functionality, as described with reference to FIGS. 6A-E. The "Handle" parameter comprises a handler function that is invoked after an access violation has been detected. Such handler functionality may be implemented with a variety of different actions, as described with reference to FIGS. 6A-E. The actual "handle" parameter may represent a descriptor or the identifier of a previously registered resource or routine.

Figure 6A:
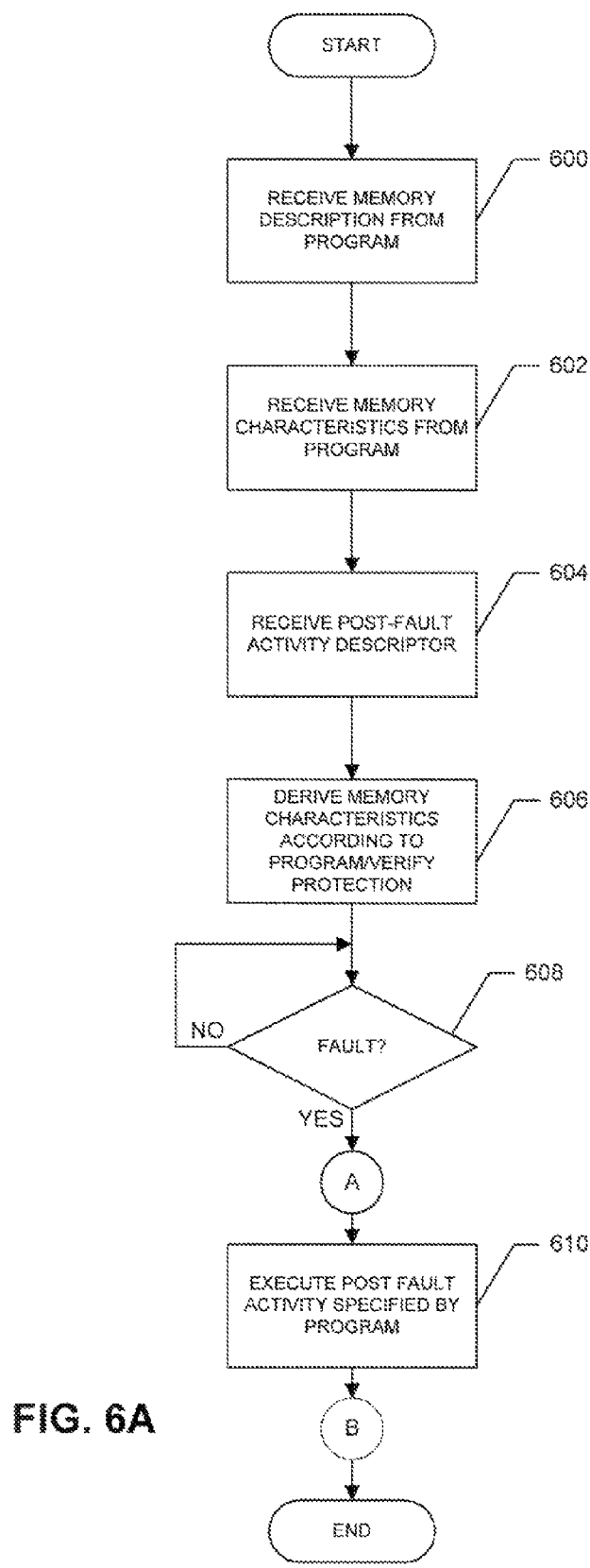
FIG. 6A is a flowchart illustrating an algorithm in accordance with one embodiment of the memory protection API.

Referring to FIG. 6A, a flowchart of the functionality performed by the disclosed memory protection API, in accordance with one embodiment, is illustrated. This functionality will first be described with reference to a guest program, APP 40X, executing within a VM such as VM 300X of FIG. 3A-C or FIG. 4. First, virtual system hardware 310X receives through Hypercall API 241B, by calling Bool Hyp_Protect, a data parameter identifying the memory which the guest program wishes to protect/unprotect, as illustrated by process block 600. Such data parameter may have the "ppnList" form described herein and may be implemented with an array object which contains a list of plural physical page numbers to be protected/unprotected. Thereafter, or as part of the same data structure, virtual system hardware 310X receives through Hypercall API 241B a data parameter description of the memory access characteristics associated with the identified memory page(s), as illustrated by process block 602. Such data parameter description may have the "prot" form described herein and may be implemented with a plurality of variables, such as binary protection bits, representing the read, write and execute properties associated with one of the identified memory pages. In one embodiment, the protection bits may be transmitted in the same array object which contains the physical page number to be protected/unprotected. Thereafter, or as part of the same data structure and communication, virtual system hardware 310 receives through Hypercall API 241B a data descriptor of a post fault activity, as illustrated by process block 604. Such data parameter may have the "Handle" form described herein and may also be transmitted in the same array object which contains the physical page numbers and/or the protection bits. In one embodiment, the descriptor identifies a handler function which may be executed in the event that a fault is generated from a memory access operation associated with one of the identified memory page. It will be obvious to those reasonably skilled in the art that the functionality described with reference to process blocks 600, 602 and 604 may be achieved with a single procedural call, particularly if a single data structure is passed through the Hypercall API 421B, such as the array object 700 described with reference to FIG. 7.

Figure 7:
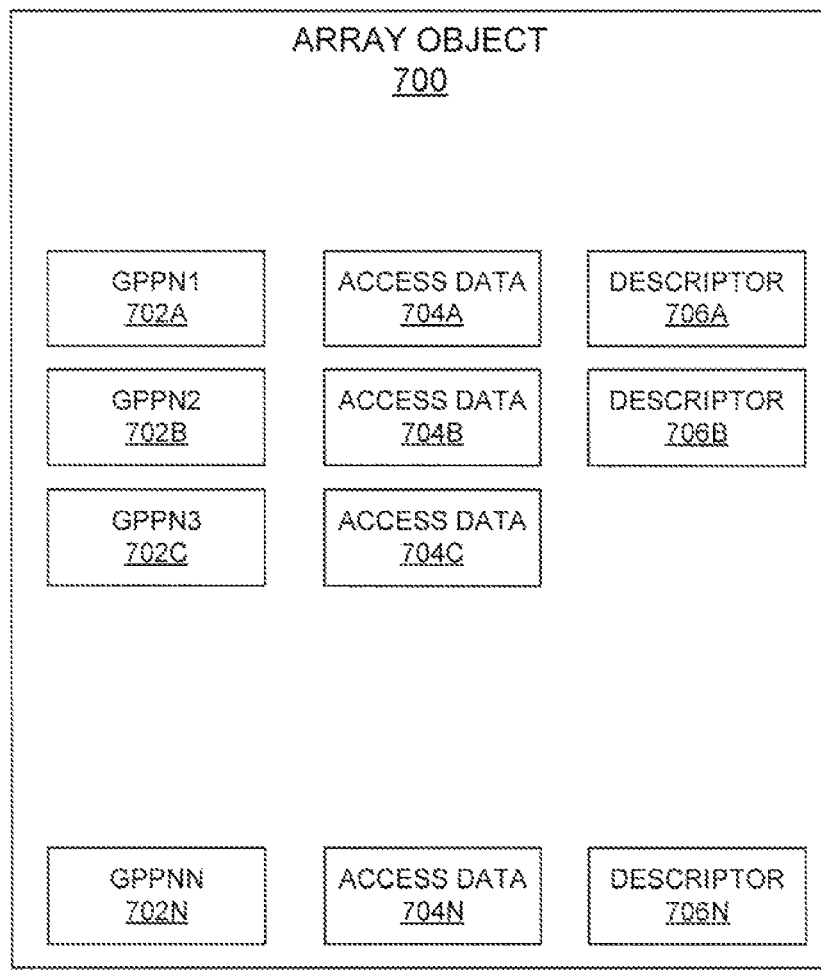
FIG. 7 illustrates a conceptual data structure for passing data in accordance with one embodiment.

FIG. 7 illustrates conceptually the structure of such an array object 700 including a plurality of guest PPNs 702A-N, a plurality of protection bit sets 704A-N, and a plurality of post fault activity descriptors 706A-N. Note that in array object 700, there is not necessarily a one-to-one correspondence between each of the values 702, 704 and 706, for example, not every memory page 702 A-N has associated therewith a corresponding post fault activity descriptor 706.

Referring again to FIG. 6A, once virtual system hardware 310 receives through hypercall API 241B the data parameters identifying selected portions of memory and the access characteristics thereto, as illustrated by process block 600-604, the memory manager 256X derives the memory access properties associated with the identified memory pages, as illustrated by process block 606. The contemplated system enables protection bits to be specified directly to the VMM.

FIG. 5 illustrates conceptually the mappings of a GVPN, GPPN and PPN that are extended to include access modes or memory protection bits. In the illustrative embodiment, the VMM 250X first retrieves the relevant page table entry from guest OS page table 22D and places it into a Virtual TLB (not shown) before deriving protection bits 221 from protection bits 319 and 229. Code within the Memory Manager 256B of VMM 250X compares the protection bits 319 specified by APP 40X with protection bits 229 previously stored by Address Mapping Module 220B. Such comparison activity, in one embodiment, may comprise performing a logical operation, for example a Boolean OR operation or a Boolean AND operation, on the protection bits received from the guest program with similar protection already associated with the program in the address mapping module 220B and storing the results in association with a guest program memory page. The resulting protection bits 221 are stored as part of the shadow page table 222B, as well as in an optional additional data structure maintained in the virtualization software 200B and controlled thereby.

Thereafter, execution of the instruction stream APP 40X occurs until a trace or fault is generated upon a memory access operation to one of the memory pages identified through the hypercall API 421B, such faults occurring in an operation in violation of one of the protection bits, i.e., a read, write or execute operation is requested but not authorized. Note that a trace can also be triggered by another application or the guest kernel 20X accessing the traced memory. Once a trace fault occurs, as illustrated by decisional block 608, the VMM accesses the information provided by APP 40X through the hypercall API 421B to determine if a descriptor of any post fault activity was associated with the faulting memory page. If so, the VMM initiates execution of the post fault activity specified by APP 40X, as illustrated by process block 610. Such post fault activities may be initialized by the VMM or maybe fully performed by the VMM, as explained herein with reference to the flowcharts of FIGS. 6B-E.

The subject disclosure contemplates a variety of different activities which may be used either singularly, or in combination, in response to a fault, i.e, an access violation to a memory page. The flowcharts of FIGS. 6B-F describes one or more possible activities performed that maybe performed following detection of the access violation, as part of the functionality designated by reference to process block 610.

Figure 6E:
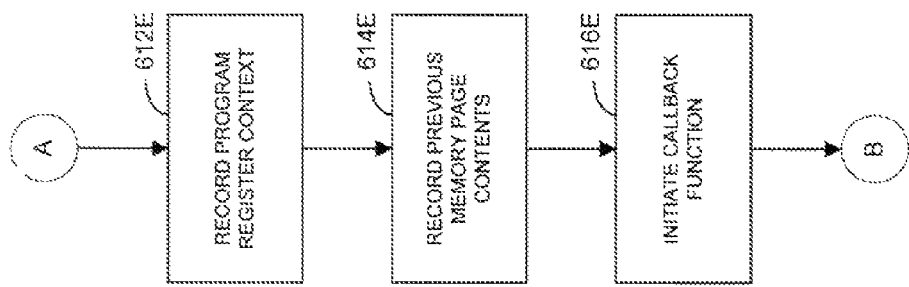
FIG. 6E is a flowchart illustrating a post fault functional algorithm in accordance with one embodiment of the algorithm of FIG. 6A.
Figure 6D:
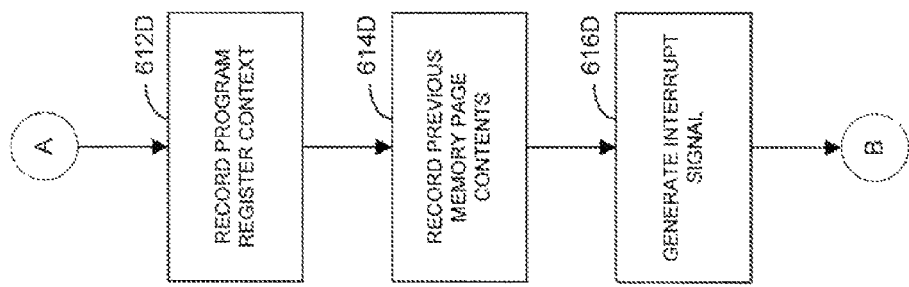
FIG. 6D is a flowchart illustrating a post fault functional algorithm in accordance with one embodiment of the algorithm of FIG. 6A.
Figure 6C:
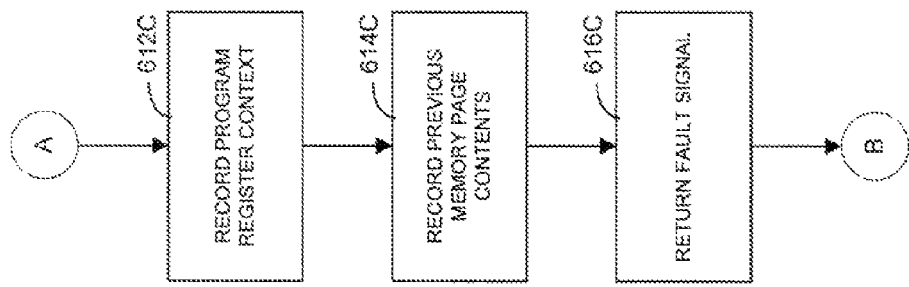
FIG. 6C is a flowchart illustrating a post fault functional algorithm in accordance with one embodiment of the algorithm of FIG. 6A.
Figure 6B:
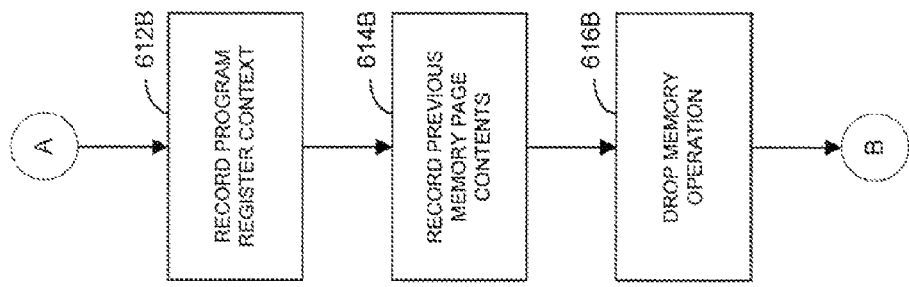
FIG. 6B is a flowchart illustrating a post fault functional algorithm in accordance with one embodiment of the algorithm of FIG. 6A.

Referring to FIG. 6B, when a trace fault occurs, it may be resolved with some combination of the functionality described in one or more of process blocks 612B and 614B, in combination with the functionality described in process blocks 616B. Specifically, the guest program register context is recorded by the VMM upon the occurrence of a trace fault, as illustrated by process blocks 612B. In process 614B, the content of the previous memory page is recorded to a specified backup PPN by the VMM upon the occurrence of a trace fault. In process 616B, the memory access operation is silently dropped upon the occurrence of a trace fault. The functionality described in either of process blocks 612B and 614B will typically occur prior to be discontinuance of the memory operation. In one embodiment, the functionality described in either or both of process blocks 612B and 614B may be eliminated. In another embodiment, the sequential order of process blocks 612B and 614B may be reversed from that shown.

Referring to FIG. 6C, when a trace fault occurs, it may be resolved with some combination of the functionality described in one or more of process blocks 612C and 614C, in combination with the functionality described in process blocks 616C. The functionality, ordering and necessity of process blocks 612C and block 614C are similar to process blocks 612B and block 614B of FIG. 6B. In process 616C, a fault signal is returned to APP 40X by the VMM 250X upon the occurrence of a trace fault.

Referring to FIG. 6D, when a trace fault occurs, it may be resolved with some combination of the functionality described in one or more of process blocks 612D and 614D, in combination with the functionality described in process blocks 616D. Again, the functionality, ordering and necessity of process blocks 612D and block 614D are similar to process blocks 612B and block 614B of FIG. 6B. In process 616D, before the memory access instruction is executed, an interrupt is triggered, if enabled, upon the occurrence of a trace fault.

Referring to FIG. 6E, when a trace fault occurs, it may be resolved with some combination of the functionality described in one or more of process blocks 612E and 614E, in combination with the functionality described in process blocks 616E. The functionality, ordering and necessity of process blocks 612E and block 614E are similar to process blocks 612B and block 614B of FIG. 6B. In process 616E, a callback function previously registered with the VMM is invoked, upon the occurrence of a trace fault. The callback function can be part of VMM, VM APP (VMX), or some other program communicating with the VMX. Optionally, the hypercall function may optionally install an asynchronous callback function so that the function returns a call back when a modification attempt is made to the memory contents.

A wide variety of restrictions may be placed on the making of hypervisor calls and on the passing of information using hypervisor calls, depending on the requirements of the implementation. For example, a policy can be enforced that a hypervisor call can only be made through a predefined set of entrances into a special gate page of memory in which all valid hypervisor calls are defined. Also, certain checks can be made on the software module that places a hypervisor call, such as running a hash algorithm on the memory page(s) containing the calling software module, and comparing the outcome of the hash to expected values for software modules that are allowed to make hypervisor calls. As another alternative, hypervisor calls may be permitted only from specific portions of code in the code cache of a binary translation system within the virtualization software, where those specific portions of code are created by the same vendor as the virtualization software and the code is generated and distributed along with the virtualization software 250X, for example. Hypervisor calls can also be secured with other validity checks commonly used in secure communications.

In order to achieve similar memory protection functionality from outside the VM, an explicit API 421A, such as may be established between APP 40Z and the virtualization software 250X (FIG. 3B-C) or between APP 40Z and VM APP 292 (FIG. 3A), may be used. In such embodiments, API 421A may have a similar implementation and function similar to API 421B but may require modification to the APP 40Z. Such modifications may vary depending on the particular hardware and software configurations and the relative importance that is placed on a variety of factors, including the degree of security desired and the amount and nature of communication and interaction that is desired between the external application and the virtualization software.

In FIG. 3A, if APP 40Z and API 421A have not been loaded into the computer system, an installer, not shown, may be started from outside the VM 300X, so that the installer can interface directly with the virtualization software 200X. The installer may interact with the virtualization software 250X to install the API 421A and the APP 40Z. The APP 40Z may be linked to the API 421A prior to installation, or may be linked after installation by a secure dynamic loader when the application 40Z first executes. After the APP 40Z and API 421A have been installed, and loaded into the VM memory, the API 421A may begin to execute, such as in response to the activation of the application by a user allowing.

Figure 3B:
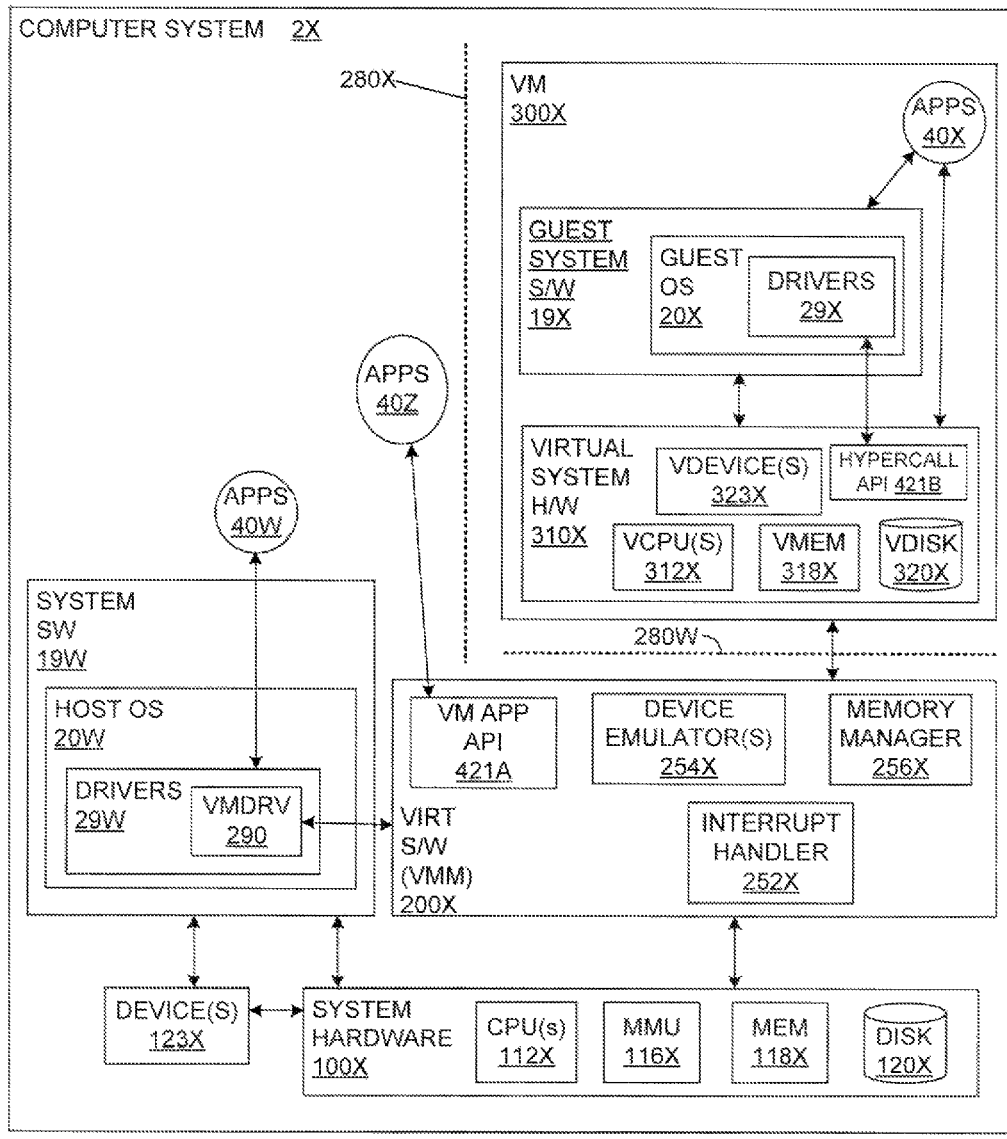
Figure 3C:
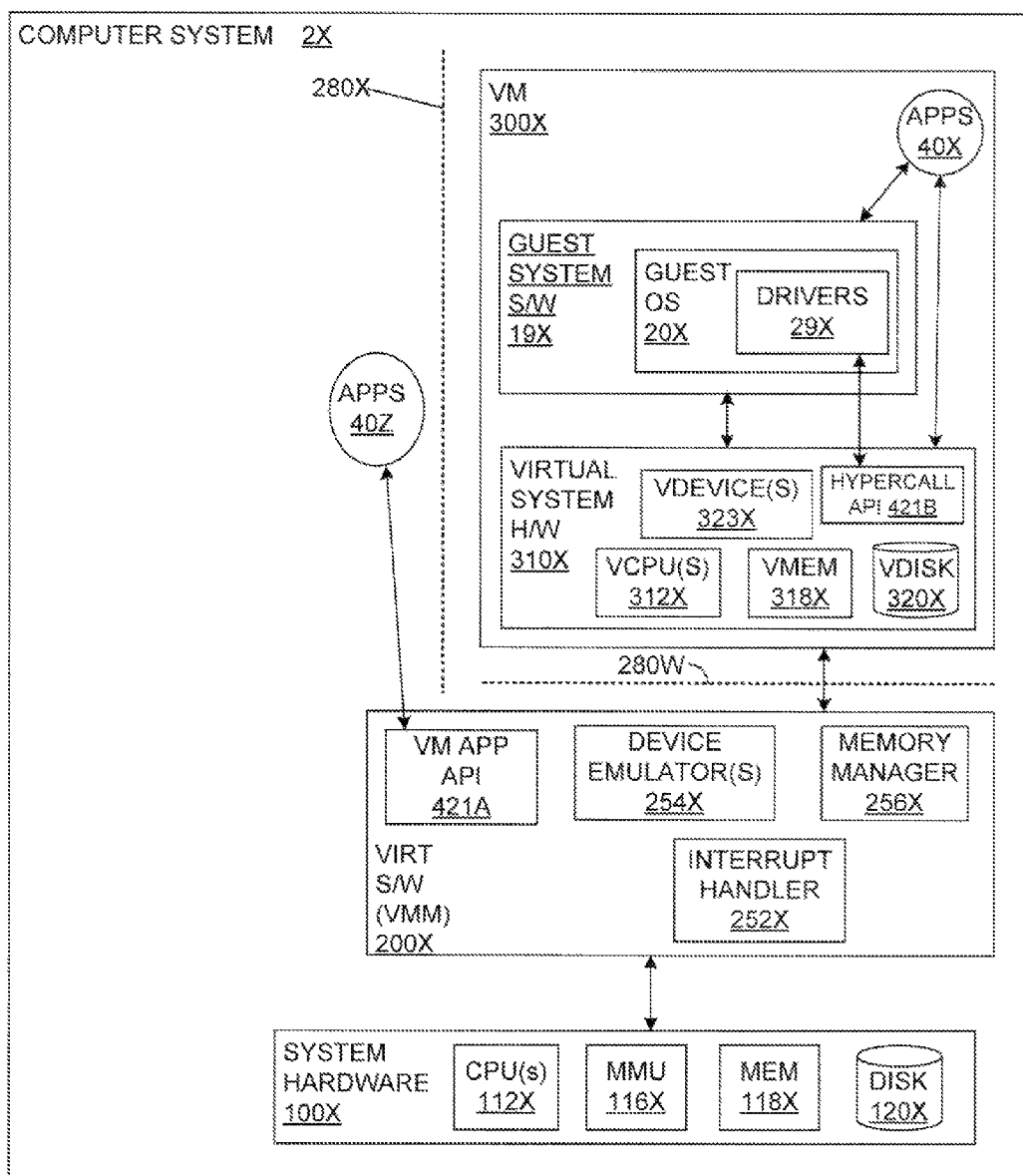

FIGS. 3B-C and 4 show a secure application 40Z which may generally be an ordinary application that can run in other execution environments. For example, the APP 40Z may be an application that could also be run in the VM 300X, similar to APP 40X. Application 40Z may be customized in one or more ways for execution with VMM 250X. The description of the implementation and functionality of API 421A and its interaction with APP 40Z is similar to that of API 421B and its interaction with APP 40X and will be obvious to the reasonably skilled in the arts in light of the disclosure herein.

Referring to FIGS. 3A-C and 4, the described APIs 421A and 421B can be used in a number of different ways, including to protect a guest program, to protect a guest kernel, or for debugging of a guest program. Specifically, in the first scenario, a guest program APP 40X running in the guest OS uses a hypercall to communicate with the VMM 250X through the virtual system hardware 310X to secure or lock down some or all of its memory. Typically, such program is an agent for malware protection. In the second scenario, to protect kernel 20X, a guest kernel driver 29X uses a hypercall to communicate with the VMM 250X through the virtual system hardware 310X. Such a driver can be implemented so that when the driver is loaded, the driver secures or locks down the kernel code and some critical, read-only kernel data structure. In the third scenario, for debugging of a guest program, a debugger program executing either within or external to the VM 300X, may detect certain accesses to a range of physical memory and calls VM APP (VMX) 292 through API 421 provided by VM APP. The VM APP then sends the request to the VMM 250X. In these different scenarios the APIs 421 allow the VMM 250X to receive memory protection requests.

In accordance with another aspect of the invention, besides the protection API described herein a technique to attest the protection to another software entity using the API is contemplated. The functionality may be implemented in all software running inside or outside of the guest or host machine. An exemplary implementation of the attestation API function in the "C" programming language is shown below:

void Hyp_GetMeasurePPNs(PPN_List *ppnlist, Measurement *measuredData, Handle *handleList);

In the above example "ppnList" may have the same format and function similar to that previously described herein with reference to the Hyp_Protect and Hyp_Unprotect hypercall functions. In the above example, hyper-call API function "measuredData" comprises functionality that enables access to the pages to be verified, that is, the measured value for a PPN is obtained when the last Hyp_Protect was invoked on the specified PPN. In a contemplated embodiment, the measured value can be a copy or a secure hash of the content of the memory page, such secure hash value and the process for deriving the same being known in the relevant arts. In one embodiment, to verify the content of locked down memory, a digest of the contents of memory being locked down may be accepted or returned at the time of the lock down request, as also illustrated by process block 606 of FIG. 6A, thereby enabling the disclosed technique to also work on a SMP machine. It will further be obvious to those reasonably skilled in the art that any number of algorithms or techniques may be utilized to obtain a measured value, in addition to those techniques described herein. The "handleList" parameter may comprises a list of the last handle for the PPNs, or VPNs, as applicable, identified in the first parameter, such handles having been described herein with reference to FIGS. 6A-E.

The reader will appreciate that even if malicious software is able to compromise the guest OSs 20B and 20C, it is still not likely compromise the memory associated with applications 40X or 40Z using the techniques and API disclosed herein.

Although the concepts disclosed herein are described with reference to specific implementations, many other variations are possible. For example, the techniques and systems described herein may be used in both a hosted and a non-hosted virtualized computer system, regardless of the degree of virtualization, and in which the virtual machine(s) have any number of physical and/or logical virtualized processors. In addition, such functionality may also be implemented directly in a computer's primary operating system, both where the operating system is designed to support virtual machines and where it is not. Moreover, the concepts may even be implemented wholly or partially in hardware, for example in processor architectures intended to provide hardware support for virtual machines. Also, numerous programming techniques utilizing various data structures and memory configurations may be utilized to achieve the results described herein. For example, the tables, record structures and objects may all be implemented in different configurations, redundant, distributed, etc., while still achieving the same results.

Also, the invention may also be implemented in other computer systems that involve less than full virtualization. Thus, the invention may be implemented in systems in which direct access is provided to some physical resources, instead of virtualizing all physical resources. In addition, this invention may be implemented in computer systems involving so-called paravirtualization. In paravirtualized computer systems, the virtualized hardware platform is not identical to an actual physical platform, so software that is designed to run on the actual physical platform should be modified or ported to run on the virtualized hardware platform. This invention may be implemented in a wide variety of virtual computer systems, ranging from systems in which only selected physical resources are virtualized to systems in which a complete, actual hardware platform is virtualized.

In addition to any of the foregoing implementations, subject matter described herein may be implemented in either all software, all hardware, or a combination of hardware and software, including program code stored in firmware format to support dedicated hardware. A software implementation of the above described embodiment(s) may comprise a series of computer instructions either fixed on a tangible medium, such as a computer readable media, e.g. diskette, CD-ROM, or disks, or transmittable to a computer system in a carrier wave, via a modem or other interface device, such as a communications adapter connected to the network over a medium. Such medium may be either a tangible medium, including but not limited to optical or analog communications lines, or may be implemented with wireless techniques, including but not limited to microwave, infrared or other transmission techniques. The series of computer instructions, whether contained in a tangible medium or not, embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

What is claimed is:

1. A computer program product embodied on a non-transitory computer readable storage medium for execution in a computer system comprising physical system hardware having a processor operatively coupled to a plurality of physical memory locations and virtualization software executing on the physical system hardware and supporting at least one virtual machine (VM) and at least one instance of virtual system hardware, the computer program product comprising:
    program logic for implementing an interface to the virtual system hardware directly accessible by a program without intermediation of an operating system software, the interface comprising,
        i) program logic responsive to data identifying selected portions of memory associated with the program and requested access characteristics associated with said memory portions;
        ii) program logic for deriving the memory access characteristics of the selected portions of memory at least partially in accordance with the requested access characteristics specified by the program; and
        iii) program logic for initiating performing predefined functionality upon the occurrence of a fault associated with one of the selected portions of memory.

2. The computer program product of claim 1, wherein the program is executing one of internal and external to the virtual machine.

3. The computer program product of claim 1 wherein the data identifying selected portions of memory comprises an array object defining a plurality of memory pages associated with the program.

4. The computer program product of claim 3 wherein the data identifying the requested access characteristics comprises an array object defining a plurality of variables associated with at least one memory page.

5. The computer program product of claim 4, wherein the data identifying the memory access characteristics comprises an array object defining a plurality of protection bits associated with at least one memory page.

6. The computer program product of claim 5 wherein ii) further comprises:
    a) performing a logical operation on the protection bits received from the program and storing the results in association with the program memory page.

7. The computer program product of claim 1, wherein iii) comprises:
    a) program logic for returning a fault signal.

8. The computer program product of claim 1, wherein iii) comprises:
    a) program logic for recording content of a previous memory page to a specified backup physical page number.

9. The computer program product of claim 1, wherein iii) comprises:
    a) program logic for discontinuing the memory access operation.

10. The computer program product of claim 1, wherein iii) comprises:
a) program logic for recording the program register context.

11. The computer program product of claim 1, wherein iii) comprises:
a) program logic for generating an interrupt before an instruction is executed.

12. The computer program product of claim 1, wherein iii) comprises:
a) program logic for executing a callback routine.

13. The computer program product of claim 1, wherein the data identifying selected portions of memory associated with the program comprises data identifying one of a physical page number and a virtual page number.

14. The computer program product of claim 13, wherein the data identifying the memory access characteristics comprises any of read, write and execute variables associated with one of a physical page number and a virtual page number.

15. A computer program product embodied on a non-transitory computer readable storage medium for execution in a computer system having physical system hardware supporting execution of at least one virtual machine (VM), the virtual machine further supporting execution of a guest program under the control of a guest operating system on virtual system hardware, the computer program product performing a method for defining memory access characteristics of guest program data stored at one or more physical addresses in physical memory in the system hardware, the method comprising:
A) providing the guest program with a direct interface to the virtual system hardware that does not require connection to the guest operating system;
B) receiving from the guest program data identifying at least one memory page containing data associated with the guest program;
C) receiving from the guest program data identifying memory access characteristics for the at least one memory page containing data associated with the guest program;
D) receiving from the guest program data defining a post fault functionality;
E) setting the memory access characteristics for the at least one memory page at least partially in accordance with data received from the guest program; and
F) if the system hardware generates a fault upon an attempted memory access operation to the at least one memory page containing data associated with the guest program, initiating the post fault functionality.

16. The computer program product of claim 15 wherein the data identifying at least one memory page comprises an array object defining a plurality of memory pages.

17. The computer program product of claim 15, wherein the post fault functionality comprises:
F1) returning a fault signal.

18. The computer program product of claim 15, wherein the post fault functionality comprises:
F1) recording content of a previous memory page to a specified backup physical page number.

19. The computer program product of claim 15, wherein the post fault functionality comprises:
F1) discontinuing the memory access operation.

20. The computer program product of claim 15, wherein the post fault functionality comprises:
F1) recording a guest program register context.

21. The computer program product of claim 15, wherein the post fault functionality comprises:
F1) generating an interrupt before a guest instruction is executed.

22. The computer program product of claim 15, wherein the post fault functionality comprises:
F1) executing a callback routine.

23. The computer program product of claim 22 wherein the callback routine is integrated into one of a Virtual Machine Monitor (VMM) and Virtual Machine Application (VMA).

24. The computer program product of claim 23 wherein the callback routine is integrated into a program communicating with the VMA.

25. The computer program product of claim 15 wherein data identifying at least one memory page comprises one of a physical page number and a virtual page number.

26. The computer program product of claim 15 wherein the memory access characteristics comprise any of read, write and execute.

27. The computer program product of claim 15 wherein the data identifying the memory access characteristics comprise a plurality of protection bits.

28. The computer program product of claim 27 wherein C) further comprises:
C1) performing a logical operation on the protection bits received from the guest program and storing the results in association with a guest program memory page.

29. A computer program product embodied on a non-transitory computer readable storage medium for execution in a computer system having physical system hardware supporting execution of virtualization software and at least one instance of virtual system hardware, the computer program product performing a method for defining memory access characteristics of program data stored at one or more addresses in physical memory, the method comprising:
A) receiving, with a direct interface to the virtual system hardware that does not require intermediation of an operating system, program data identifying selected portions of memory and access characteristics thereto;
B) at least partially defining the memory access characteristics of the selected portions of memory in accordance with the data specified by the program; and
C) initiating pre-defined functionality upon the occurrence of a fault generated by an attempted access to one of the selected portions of memory.

* * * * *